United States Patent [19]
Elmore

[11] Patent Number: 5,973,082
[45] Date of Patent: *Oct. 26, 1999

[54] EPOXIDIZED VEGETABLE OIL MODIFICATION OF EPOXY ESTERS

[75] Inventor: Jim D. Elmore, Louisville, Ky.

[73] Assignee: Shell Oil Company, Houston, Tex.

[*] Notice: This patent is subject to a terminal disclaimer.

[21] Appl. No.: 08/291,318

[22] Filed: Aug. 16, 1994

Related U.S. Application Data

[63] Continuation of application No. 08/039,791, Mar. 30, 1993, abandoned.

[51] Int. Cl.⁶ .................................................. C08F 283/00
[52] U.S. Cl. ...................... 525/530; 525/508; 528/103.5; 524/396; 524/398
[58] Field of Search .................................... 525/530, 508; 528/103.5, 427; 524/396, 398

[56] References Cited

U.S. PATENT DOCUMENTS

| | | | |
|---|---|---|---|
| 2,682,514 | 6/1954 | Newey | 260/18 |
| 2,944,035 | 7/1960 | Wear | 528/111.3 |
| 4,119,640 | 10/1978 | Hodakowski | 549/547 |
| 4,229,330 | 10/1980 | Konii et al. | 528/158.5 |
| 4,292,413 | 9/1981 | Blount | 521/99 |
| 4,474,941 | 10/1984 | Wilk et al. | 528/296 |
| 4,980,397 | 12/1990 | Rao et al. | 523/414 |
| 5,095,050 | 3/1992 | Treybig et al. | 528/108 |
| 5,227,453 | 7/1993 | Elmore et al. | 528/112 |

OTHER PUBLICATIONS

"Vernonia Oil: A New Reactive Diluent," by S. Dirlikov, M. S. Islam, and P. Muturi, *Modern Paint and Coatings*, Aug. 1990, pp. 45–54.

"Simultaneous Interpenetrating Networks from Epoxidized Triglyceride Oils: Morphology and Mechanical Behavior," by S. Qureshi, J.A. Manson, L.H. Sperling, and C.J. Murphy, *Polymer Science and Technology*, vol. 17., Plenum Press, New York (1983).

"Studies in Autoxidation. Part II and Part III," by R.A. Hancock, N.J. Leeves, and P. F. Nicks, *Progress in Organic Coatings*, 17 (1989) pp. 337–358.

"Linoleic Based Coatings: A Study of the Dry Film Structure," by N.A.R. Falla, *Journal of Coatings Technology*, vol. 64, No. 815, Dec. 1992, pp. 55–60.

"Studies in Autoxidation. Part I," by R.A. Hancock, N.J. Leeves, and P.F. Nicks, *Progress in Organic Coatings*, 17 (1989) pp. 321–336.

"Chemical Epoxidation of a Natural Unsaturated Epoxy Seed Oil from *Vernonia galamensis* and a Look at Epoxy Oil Markets," by K.D. Carlson and S.P. Chang, *JAOCS*, vol. 62, No. 5 (May 1985) pp. 934–939.

*Primary Examiner*—Randy Gulakowski

[57] ABSTRACT

High solids coating compositions are made from organic solvent solutions of (A), the reaction product of (1) an epoxidized vegetable oil, (2) a diglycidyl ether of a dihydric phenol, and (3) a dihydric phenol, reacted with (B) an unsaturated fatty acid, and (C) an alkylacetoacetate.

19 Claims, No Drawings

EPOXIDIZED VEGETABLE OIL MODIFICATION OF EPOXY ESTERS

This is a continuation of application Ser. No. 08/039,791, filed Mar. 30, 1993 now abandoned.

BACKGROUND OF THE INVENTION

The field of art to which this invention is directed is epoxy ester coating compositions.

The basic epoxy resin composition is the diglycidyl ether of a dihydric phenol, the most important of which from a commercial viewpoint is the diglycidyl ether of p,p'-dihydroxydiphenyl propane (Bisphenol A). Such diglycidyl ethers can be converted into thermoset compositions by a wide variety of curing agents, or can be converted into higher molecular weight epoxy resins by reaction with additional dihydric phenol. These higher molecular weight epoxy resins are used primarily in solution coatings wherein they are crosslinked with various crosslinking agents, e.g., aminoplast resins, polyisocyanates or polyamines, or are reacted with unsaturated fatty acids to form epoxy esters.

In addition to modification with dihydric phenols and unsaturated fatty acids, epoxy resins have been modified either by reaction or by blending with a variety of compounds.

Blends of polyglycidyl ethers of polyhydric phenols with epoxidized fatty acid esters, e.g., epoxidized linseed oil, are described in U.S. Pat. No. 2,628,514.

Adhesive compositions made from blends of liquid polyglycidyl ethers of dihydric phenols, solid polyglycidyl ethers of dihydric phenols and epoxidized fatty acid esters are described in U.S. Pat. No. 2,682,515.

In U.S. Pat. No. 2,944,035, epoxidized fatty acid esters are reacted with mono or polyhydric phenols in such amounts that some of the epoxy groups remain unreacted. The resulting compositions are then crosslinked with various crosslinking agents.

U.S. Pat. No. 4,119,640 discloses polymerizable reaction product mixtures made by reacting an epoxidized fatty acid ester with a mixture of acrylic acid, a diepoxide and a modifying compound.

U.S. Pat. No. 4,419,467 describes higher molecular weight epoxy resins made by reacting lower molecular weight epoxy resins with polyether polyols.

In U.S. Pat. No. 4,980,397, higher molecular weight epoxy resins are made by coreacting aliphatic diepoxides, glycidyl ethers of dihydric phenols and dihydric phenols.

U.S. Pat. No. 4,474,941 discloses alkyd resins which are modified with partially epoxidized vegetable oils.

Advanced epoxy resins, as described in U.S. Pat. No. 5,095,050, are made from epoxidized vegetable oils, dihydric phenols and phosphorous—containing compounds.

In copending U.S. patent application Ser. No. 07/832,992, filed Feb. 10, 1992, epoxy esters are made from the reaction product of vernonia oil, a diglycidyl ether of a dihydric phenol, and a dihydric phenol, further reacted with unsaturated fatty acids and alkylacetoacetates.

Manufacturers of paints and coatings are under increasing government pressure to reduce volatile organic compounds (VOC's) contained in their coating formulations. There is a need for resins systems which can be used to form high solids solutions at viscosities suitable for use in coating formulations.

SUMMARY OF THE INVENTION

This invention is directed to modified epoxy ester compositions which can be used to make high solids content organic solvent solutions useful in coating formulations.

The composition of this invention is an epoxy ester composition made from (A) the reaction product of (1) an epoxidized vegetable oil having an epoxide equivalent weight of about 400 to about 475, (2) a diglycidyl ether of a dihydric phenol having an epoxide equivalent weight of about 115 to about 250, and (3) a dihydric phenol, (B) an unsaturated fatty acid, and (C) an alkylacetoacetate.

The components (1), (2) and (3) are reacted in such amounts that about 1.2 to about 1.5 epoxy groups of (1) and (2) are present for each phenolic group of (3), and wherein (1) is present in the amount of about 15 to about 35 weight percent based on the total weight of (1), (2) and (3).

The unsaturated fatty acid (B) is reacted in the amount of about 15 to about 40 weight percent based on the weight of the epoxy ester composition.

The alkylacetoacetate is reacted in the amount of about 3 to about 10 weight percent based on the weight of the epoxy ester composition.

The epoxy ester composition of this invention is useful in formulating high solids, low VOC air drying and heat curing coating compositions.

DESCRIPTION OF THE INVENTION

The epoxidized vegetable oils used in this invention are obtained by the epoxidation of triglycerides of unsaturated fatty acids. They are made by epoxidizing the reactive olefin groups of the naturally occurring triglyceride oils. The olefin groups can be epoxidized with peracids, such as perbenzoic, peracetic and the like, and with hydrogen peroxide. Procedures for preparing epoxidized vegetable oils are described in "Advanced organic Chemistry", 2nd Ed. by J. March, McGraw-Hill Book Company, 1977, p.750, in U.S. Pat. No. 3,488,404, and in the J. of org. Chem, 1983, Vol. 48, pp. 3831–3833 by C. Venturello, et al.

Suitable epoxidized vegetable oils are epoxidized linseed oil, epoxidized soybean oil, epoxidized corn oil, epoxidized cottonseed oil, epoxidized perilla oil, epoxidized safflower oil and the like. The preferred epoxidized vegetable oils are epoxidized linseed oil and epoxidized soybean oil.

The epoxidized vegetable oils useful in this invention are those which have an epoxide equivalent weight of about 400 to about 475. Partially epoxidized vegetable oils having these epoxy contents can be used. However, the preferred epoxidized vegetable oils, which have epoxide equivalent weights within this range are those which are obtained by reacting an epoxidized vegetable oil having a minimum epoxide equivalent weight of about 225 with a monocarboxylic acid or a monohydric phenol. In other words, epoxidized vegetable oils having epoxide equivalent weights within the range of about 225 to about 475 are reacted with enough monocarboxylic acid or monohydric phenol in order to obtain adducts with epoxide equivalent weights of about 400 to about 475. The resulting epoxidized triglyceride adducts have an average of about 2 to about 2.5 epoxide groups per molecule.

It is important that the epoxidized vegetable oils used in this invention never have an epoxide equivalent weight less than about 225. For example, epoxidized linseed oil having an epoxide equivalent weight of 178 can be reacted with a monocarboxylic acid or a monohydric phenol to raise the equivalent weight to 400–475. When attempts are made to use this modified epoxidized linseed oil in this invention, the reactants gel either in the upgrade reaction or in the subsequent esterification reaction. However, when an epoxidized linseed oil having an epoxide equivalent weight of 229 modified with a monocarboxylic acid or monohyciric phenol to an equivalent weight of 400–475 is used, the composition of this invention is readily obtained.

Linseed oil contains a high percentage (35–65%) of esterified linolenic acid, an acid which contains 3 non-conjugated double bonds. When epoxidized to a high epoxy content, i.e., epoxide equivalent weight of less than about 225, the epoxidized molecules contain a high percentage of triepoxy stearates. It has been postulated that even after reaction with the monocarboxylic acid or monohydric phenol, a large number of diepoxy stearate moieties remain. Subsequent reactions with these highly functional molecules result in branching and gelation. Regardless of why gelation occurs, it has been found that use of an epoxidized oil having an epoxide equivalent weight greater than about 225 avoids the gelation problem.

Suitable monohydric phenols which can be used to modify the epoxidized vegetable oils are phenol and alkyl phenols wherein the alkyl group contains 1 to 9 carbon atoms. A preferred monohydric phenol is cresol.

Suitable monocarboxylic acid which can be used to modify the epoxidized vegetable oils are those which contain 7 to about 22 carbon atoms in their molecular structure. Preferred monocarboxylic acids are aromatic acids or alicyclic acids, e.g., benzoic acid or abietic acid. Gum rosin can also be used as the acidic component. In order to raise the epoxide equivalent weight to about 400 to about 475, the monohydric phenol or monocarboxylic acid are used in the amount of 0 to about 0.4 mole per each epoxy equivalent of the epoxidized vegetable oil in order to adjust the number of epoxy groups per molecule of triglyceride to about 2.5 or less.

The diglycidyl ether of the dihydric phenol used in this invention has an epoxide equivalent weight of about 115 to about 250, preferably about 180 to about 200. Such diglycidyl ethers are made by reacting epichlorohydrin and a dihydric phenol with caustic. Examples of dihydric phenols are resorcinol, dihydroxybiphenyl, dihydroxydiphenyl methane, p,p'-dihydroxy diphenyl propane, or Bisphenol A as it is commonly called, dihydroxydiphenyl sulfone, dihydroxydiphenyl carbonate, and the like. The preferred dihydric phenol is p,p'-dihydroxydiphenyl propane.

The dihydric phenols which are reacted with the diglycidyl ether and the epoxidized vegetable oil are the same dihydric phenols described hereinabove from which the diglycidyl ethers are derived. Such phenols contain only two phenolic hydroxyl groups and no other groups which are reactive under the reaction conditions used in this invention. Such dihydric phenols have molecular weights of about 110 to about 300. The preferred dihydric phenol is p,p'-dihydroxydiphenyl propane.

The diglycidyl ether of the dihydric phenol, the epoxidized vegetable oil and the dihydric phenol are reacted together in what is referred to in the art as the advancement or upgrade process wherein the phenolic hydroxyls are reacted with the epoxy groups to form higher molecular weight resins.

The upgrade catalysts used in this invention are the phosphonium salts described in U.S. Pat. Nos. 3,477,990, 3,948,855, 4,132,706 and 4,395,574, which are hereby incorporated by reference. These phosphoniums salts can be represented by the formula:

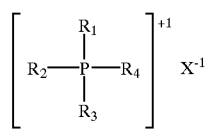

wherein $R_1$, $R_2$, $R_3$ and $R_4$ are the same or different and represent hydrocarbon residues which may or may not be substituted with one or more groups such as halogen atoms or the nitrate group. The hydrocarbon residues can be aliphatic hydrocarbon radicals containing one to about 20 carbon atoms, aromatic hydrocarbon radicals and alkyl substituted aromatic hydrocarbon radicals. X is a halide or the anion portion of an acid, ester or acid-ester of an element selected from carbon and phosphorous. Examples of such acids, esters, or acid-esters are carbonic acid, acetic acid, propionic acid, diethyl phosphate and the like. Preferred catalysts are those wherein one R is an alkyl group and the remaining R's are aromatic groups and wherein the anion is derived from an organic acid. A particularly preferred catalyst is ethyltriphenylphosphonium acetate.

The upgrade catalysts are used in the amount of about 0.05 to about 0.1 weight percent based on the total weight of the reactants.

The upgrade reaction can be conducted by adding all of the components together and heating until the desired extent of reaction is obtained as determined by epoxide equivalent weight. Preferably the reaction is conducted by adding the epoxidized vegetable oil with epoxy equivalent weight of about 400 to about 475, dihydric phenol and catalyst, heating with stirring until the dihydric phenol dissolves and then adding the diglycidyl ether of the dihydric phenol. The reaction is conducted at a temperature of about 350° F. to about 450° F., preferably about 390–410° F., until the phenolic hydroxyls are etherified as determined by the calculated increase in epoxide equivalent weight. Generally the time required for the reaction will be about 2 to about 4 hours.

It has been found that the use of aluminum complexes with salicylic acid as cocatalysts with the phosphonium salt increases the reactivity rate of the epoxy groups in the epoxidized vegetable oil. The aluminum complexes contain aluminum chelated with salicylic acid and further complexed with alkanols containing one to six carbon atoms and alkanoic acids containing two to ten carbon atoms. Preferably, the aluminum complex will contain 6 aluminum atoms complexed with one mole of salicylic acid, about 2 moles of isopropanol and about 2 moles of 2-ethyl-hexanoic acid. The aluminum complex is used in the amount of about 0.05 to about 0.1 weight percent based on the total weight of the reactants. These type aluminum compounds include XP167 manufactured by Rhone-Poulenc Chemicals Manchem, Inc.

In order to prevent oxidation during the upgrade reaction, phosphite antioxidants can be utilized. Suitable phosphites are the alkyl-aryl phosphites, such as diphenyl isodecyl phosphite, phenyl diisodecyl phospite, and the like. A particularly preferred phosphite antioxidant is poly 4,4'-isopropylidenediphenol mixed $C_{12}$ to $C_{15}$ alcohol phosphite. The antioxidants are used in amounts up to about 1 weight percent based on the total reactants' weight, preferably about 0.5 to about 1 weight percent.

The upgrade products are converted to epoxy esters by esterifying them with unsaturated fatty acids. The unsaturated fatty acids are those acids derived from unsaturated vegetable oils, i.e., drying oils. Such acids which are named for the oils from which they are derived are linseed fatty acids, soybean fatty acids, tall oil fatty acid, tung oil fatty acids, dehydrated castor oil fatty acids, and the like. A preferred fatty acid is linseed.

The reaction of the upgrade epoxy resins and the unsaturated fatty acids is conducted at a temperature of about 380° F. to about 410° F. until the acid value of the reaction mixture is reduced below 25, preferably below 10, most preferably below 5. Such reaction requires about 4 to about 8 hours.

The amount of unsaturated fatty acid used in preparing the epoxy esters is about 10 to about 40 weight percent, preferably about 15 to about 25 weight percent, based on the weight of the resulting epoxy ester.

The epoxy ester is further modified by ester interchange with an alkyl acetoacetate wherein the alkyl group contains 1 to 8 carbon atoms. Preferred alkylacetoacetates are those wherein the alkyl group contains 2 to 4 carbon atoms, with tertiary butylacetoacetate being most preferred. The acetoacetate modification is conducted by heating the epoxy ester with about 3 to about 10 weight percent alkyl acetoacetate wherein said weight percent is based on the weight of the epoxy ester. Heating is conducted at about 240° to about 340° F. until the calculated amount of alcohol is recovered by distillation from the reactants, generally about 1 to about 3 hours.

In formulating coating compositions, the epoxy esters are dissolved in non-protic solvents, i.e., esters, ketones, aliphatic hydrocarbons, aromatic hydrocarbons and mixtures thereof. Examples of such solvents are butyl acetate, methylpropyl ketone, methylamyl ketone, xylene, mineral spirits and the like. Solutions can be made having Gardner Holdt viscosities at 25° C. of U at 70 percent solids and $Z_5$ at 90 percent solids.

The epoxy esters of this invention are particularly useful in the formulation of high solids air-dry or low-bake coatings. In formulating the coatings, any of the well known driers can be used to enhance the cure. A particularly useful drier package is one which contains cobalt driers in combination with cerium IV driers and aluminum acetoacetate complexes. Examples of these driers are cobalt naphthenate, cerium (IV) 2-ethylhexanoate and an aluminum acetoaceate complex represented by the formula:

wherein $R_5$ is a chelate group containing the acetoacetoxy moiety and $R_6$ and $R_7$ are the same or different and are either an alkoxide group or an acetoacetoxy group.

The alkoxide group contains 2 to about 8 carbon atoms with the preferred group being the isopropoxide group. The chelate group can be represented by the formula:

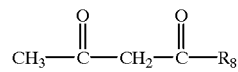

wherein $R_8$ is derived from a 2 to 4 carbon alcohol or a hydroxyalkyl ester of a polymerizable acid wherein the alkyl group contains 2 to 4 carbon atoms. Preferred chelating compounds are ethylacetoacetate and acetoacetoxyethyl methacrylate. Preferably, the aluminum complex contains one isopropoxide group, one ethylacetoacetate chelate group and one acetoacetoxyethyl methacrylate chelate group. These type aluminum complexes include XP161 manufactured by Rhone-Poulenc Chemicals Manchem, Inc.

These driers are used in the following amounts wherein said amount is expressed as weight percent metal based on 100 parts by weight of resin:
Cobalt—about 0.015 to about 0.06 weight percent
Cerium (IV)—about 0.1 to about 0.4 weight percent
Aluminum—about 0.02 to about 0.08 weight percent
The preferred amount of each of these driers is: Cobalt—0.03 weight percent; cerium (IV)—0.2 weight percent; aluminum—0.04 weight percent.

The coating compositions can contain other components, such as pigments, flow control agents, anti-skin agents, and the like, such components being well known to those skilled in the art.

The following examples describe the invention in greater detail. Parts and percentages, unless otherwise indicated are parts and percentages by weight.

EXAMPLE 1

To a suitable reactor were added 226.5 parts of epoxidized linseed oil having an epoxide equivalent weight of 242, 0.5 part of ethyl triphenylphosphonium acetate, 43.47 parts of benzoic acid, 10 parts of phosphite antioxidant (poly 4,4'-isopropylidene-diphenol mixed $C_{12}$–$C_{15}$ alcohol phosphite), and 0.5 part of a solution of aluminum complex (6 aluminum atoms complexed with one mole of salicylic acid, about 2 moles of isopropanol and about 2 moles of 2-ethylhexanoic acid wherein the solution contained 24 percent aluminum complex, 10 percent isopropyl 2-ethyl hexanoate and 66 percent methyl isobutyl ketone). Heat, agitation and nitrogen sparge were applied. The temperature was gradually raised to 309° F. over a period of 2 hours and 20 minutes. The temperature was then lowered to 264° F. The acid value was found to be 10.2. Heating at 264° F. to 269° F. was continued for 30 minutes. The diglycidyl ether of Bisphenol A, epoxide equivalent weight—190, in the amount of 476.7 parts, was added over a period of 45 minutes with the temperature dropping to 195° F. The temperature was raised to 261° F. and 253.3 parts of Bisphenol A were added over a 10 minute period. The temperature was raised to 419° F. and was held at 400–439° F. for 1 hour and 20 minutes. The epoxide equivalent weight was 1056.

Linseed fatty acids, 250 parts, preheated to 100° F., was then added over a 15 minute period with the temperature dropping to 365° F. Heat was applied raising the temperature to 380° F. in 22 minutes and to 395° F. in 2 hours and 38 minutes. The acid value was determined to be 12.4.

The reactor was equipped with a Barrett trap and slow addition of 177.6 parts of t-butylacetoacetate was begun. The addition was completed in 22 minutes with the temperature dropping from 373° F. to 279° F. Heating was continued for 4 hours and 30 minutes with distillation and removal of butanol. The temperature during this heating period rose from 296° F. to 381° F.

Methylpropyl ketone, 425 parts, was added followed by 56 parts of t-butanol. The resulting epoxy ester solution was filtered through a felt bag. The Gardner Color was 8, the non-volatiles (1 hr at 110° C.) were 74.4 percent, the Gardner-Holdt viscosity at 25° C. was Z, the acid value was 17.8 and the weight per gallon was 8.43 pounds.

To 18.9 parts of the epoxy ester solution were added 9.1 parts of methylpropyl ketone, 0.2 part of antiskinning agent, 0.161 part of cerium IV octoate containing 18 percent cerium (36 percent solids in 2-ethylhexanoic acid), 0.075 part of cobalt naphthenate containing 6 percent cobalt (54 percent solids in odorless mineral spirits, and 0.2 part of aluminum chelate complex containing 3.81 percent aluminum. The aluminum complex contained one atom of aluminum, one isopropoxide moiety, one ethylacetoacetate moiety and one acetoacetoxyethyl methacrylate moiety at 60 percent solids in mineral spirits. The resulting coating composition had a nonvolatile content of 50 percent. The Gardner-Holdt viscosity at 25° C. was A-B. After one month at room temperature, the viscosity was B-C.

Drawdowns were made on cold rolled steel at 2 and 3 mil wet film thickness, and on Bonderized 1000 steel at 3 mils wet. The coatings were tack free in 1½ hrs at room temperature and print free after 3½ hours. The pencil hardness of the coatings after the following intervals at room temperature was determined to be:

| Days | 2 mil Cold Rolled Steel | 3 mil Cold Rolled Steel | 3 mil Bonderized 1000 Steel |
|---|---|---|---|
| 3 | 2B | 5B | 6B |
| 7 | B | 2B | 2B |
| 16 | HB | 2B | 2B |
| 23 | HB | 2B | 2B |
| 33 | HB | HB | HB |

After 33 days at room temperature, the solvent resistance (methylethyl ketone (MEK)) double rubs was as follows.

| 2 mil Cold Rolled Steel | 3 mil Cold Rolled Steel | 3 mil Bonderized 1000 Steel |
|---|---|---|
| 19 | 65 | 65 |

EXAMPLE 2

To a suitable reactor were added 193.2 parts of epoxidized linseed oil having an epoxide equivalent weight of 242, 76.8 parts of gum rosin, 0.5 part of the aluminum complex solution described in the first paragraph of Example 1, 0.5 part of ethyl triphenylphosphonium acetate, 10.0 parts of the phospite antioxidant described in Example 1, 389.75 parts of Bisphenol A, 540.25 parts of the diglycidyl ether of Bisphenol A, epoxide equivalent weight 190, and 60 parts of ethyl-3-ethoxy propionate. Heat, agitation and nitrogen sparge were applied raising the temperature to 360° F. over a period of 5 hours. The epoxide equivalent weight of the reaction mass was about 900. Linseed fatty acids, 250 parts, were added and the temperature was raised to 385° F. in 55 minutes. The temperature was lowered to 260° F. over 1 hour. The epoxide equivalent weight of the reaction mass was 2986. Heating to 335° F. was continued for one hour. The acid value was 12.8.

The reactor was equipped with a Barrett trap and 177.6 parts of t-butyl acetoacetate were added over a 30 minute period with the temperature dropping to 240° F. Heating was continued with distillation and removal of t-butanol for 1 hour. The temperature was then raised to 365° F. in 30 minutes. 49.5 parts of t-butanol were recovered. Heating was discontinued Methylpropyl ketone, 425 parts, and the recovered t-butanol were added. The epoxy ester solution was then filtered through an 80 mesh filter bag.

The epoxy ester solution had a Gardner color of 6–7, a Gardner-Holdt viscosity at 25° C. of $Z-Z_1$, a nonvolatile content of 74.4 percent, an acid value of 25, and a weight per gallon of 8.5 pounds.

A coating composition was formulated with the epoxy ester solution using the same components and amounts described in Example 1. The viscosity at 50 percent nonvolatiles was A-B (Gardner-Holdt at 25° C.). Films, 3 mils wet, on cold rolled steel had a pencil hardness of 5B after 7 days.

EXAMPLE 3

Using the same procedure described in Example 1, 195.3 parts of epoxidized linseed oil having an epoxide equivalent weight of 242 and 74.7 parts of gum rosin were reacted using 10 parts of the phosphite antioxidant, 0.75 part of the aluminum complex, and 0.85 part of the phosphonium salt catalyst described in Example 1. The resulting modified epoxidized oil was reacted with 476.7 parts of the diglycidyl ether of Bisphenol A described in Example 1 and 253.3 parts of Bisphenol A. When an epoxide equivalent weight of 1100 was obtained, 250 parts of linseed fatty acids were reacted followed by 166 parts of t-butylacetoacetate. After dilution with 75 parts of methylpropyl ketone, the epoxy ester solution had a Gardner color of 6–7, a Gardner-Holdt viscosity of $Z_2-Z_3$ and a non-volatiles content of 73.1 percent.

EXAMPLE 4 (Comparative)

Using the same procedure described in Example 1, 164 parts of epoxidized linseed oil having an epoxide equivalent weight of 175 were reacted with 106 parts of gum rosin, calculated to give an epoxide equivalent weight of 435, using the same amounts of antioxidant, aluminum complex, and ethyl triphenylphosphonium acetate described in Example 1. When the acid value of the reactants was 10, 253.3 parts of Bisphenol A and 465.6 parts of the diglycidyl ether of Bisphenol A (epoxide equivalent weight—190) were added. After reacting to an epoxide equivalent weight of 1190, 240 parts of linseed fatty acids were added. Before the esterification reaction could be completed, the reaction mass began to climb the agitator, indicating gelation, and was discarded.

EXAMPLE 5 (Comparative)

Epoxidized linseed oil having an epoxide equivalent of 174, 264 parts, was blended with 736 parts of partially epoxidized linseed oil having an epoxide equivalent weight of 941. The blend had an epoxide equivalent weight of 435.

To a suitable reactor were added 205 parts of the epoxidized linseed oil blend, 360.7 parts of the diglycidyl ether of Bisphenol A—epoxide equivalent weight of 190, and 194.3 parts of Bisphenol A. Heat, stirring and nitrogen sparge were applied. All of the Bisphenol A had dissolved when the temperature reached 260° F. The phosphite antioxidant described in Example 1, 7.6 parts, the aluminum catalyst described in Example 1, 0.38 part, and 0.38 part of ethyl triphenylphosphonium acetate catalyst were added. Vacuum to 23 inches of mercury were applied. The temperature was raised to 400° F. After heating for about 2 hours, the reactants gelled.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An epoxy ester composition comprising
   (A) the reaction product of
   (1) an epoxidized vegetable oil adduct having an epoxide equivalent weight of about 400 to about 475, said epoxidized vegetable oil adduct is a reaction product of an epoxidized vegetable oil selected from the group consisting of epoxidized linseed oils, epoxidized soybean oils, epoxidized corn oils, epoxidized cotton seed oils, epoxidized perilla oils and epoxidized safflower oils having an epoxide equivalent weight of about 225 to about 475 and a monocarboxylic acid or monohydric phenol;
   (2) a diglycidyl ether of a dihydric phenol having an epoxide equivalent weight of about 115 to about 250; and
   (3) a dihydric phenol;
   reacted with
   (B) an unsaturated fatty acid; and
   (C) an alkylacetoacetate,
   wherein (1), (2) and (3) are reacted in such amounts that about 1.2 to about 1.5 epoxy groups of (1) and (2) are present for each phenolic group of (3), and
   wherein (1) is present in the amount of about 15 to about 35 weight percent based on the weight of (1), (2) and (3),
   wherein (B) is reacted in the amount of about 15 to about 40 weight percent based on the total weight of said epoxy ester composition, and
   wherein (C) is reacted in the amount of about 3 to about 10 weight percent based on the total weight of said epoxy ester composition.

2. The epoxy ester composition of claim 1 wherein the epoxidized vegetable oil is reacted with 0 to about 0.4 mole of monocarboxylic acid or monohydric phenol per each epoxy equivalent of the epoxidized vegetable oil.

3. The epoxy ester composition of claim 2 wherein the monocarboxylic acid is benzoic acid.

4. The epoxy ester composition of claim 2 wherein the monocarboxylic acid is abietic acid.

5. The epoxy ester composition of claim 2 wherein the monocarboxylic acid is gum rosin.

6. The epoxy ester composition of claim 2 wherein the monohydric phenol is cresol.

7. The epoxy ester composition of claim 1 wherein the epoxidized oil has about 2 to about 2.5 epoxy groups per molecule.

8. The epoxy ester composition of claim 1 wherein the epoxidized vegetable oil is epoxidized linseed oil or epoxidized soybean oil.

9. The epoxy ester composition of claim 1 wherein the diglycidyl ether of the dihydric phenol has an epoxide equivalent weight of about 180 to about 200.

10. The epoxy ester composition of claim 1 wherein the diglycidyl ether of the dihydric phenol is the diglycidyl ether of p,p'-dihydroxydiphenyl propane and the dihydric phenol is p,p'-dihydroxydiphenyl propane.

11. The epoxy ester composition of claim 1 wherein the unsaturated fatty acid is derived from unsaturated vegetable oil.

12. The epoxy ester composition of claim 11 wherein the unsaturated fatty acid is linseed fatty acid.

13. The epoxy ester composition of claim 1 wherein the alkyl group in the alkyl acetoacetate contains 1 to 8 carbon atoms.

14. The epoxy ester composition of claim 13 wherein the alkyl group contains 2 to 4 carbon atoms.

15. The epoxy ester composition of claim 14 wherein the alkylacetoacetate is t-butylacetoacetate.

16. The epoxy ester composition of claim 1 which contains cobalt driers in combination with cerium (IV) driers and aluminum acetoacetate complexes.

17. The epoxy ester composition of claim 16 wherein the cobalt drier is cobalt naphthenate, the cerium drier is cerium (IV) 2-ethylhexanoate and the aluminum acetoacetate complex is represented by the formula

wherein $R_5$ is a chelate group containing the acetoacetoxy moiety and $R_6$ and $R_7$ are the same or different and are either an alkoxide group or an acetoacetoxy group.

18. The epoxy ester composition of claim 16 wherein the driers are present in the amount, expressed as weight percent metal based on 100 parts by weight of resin, of about 0.015 to about 0.06 weight percent cobalt, about 0.1 to about 0.4 weight percent cerium (IV), and about 0.02 to about 0.08 weight percent aluminum.

19. A process for the preparation of an epoxy ester comprising:
    (a) reacting an epoxidized vegetable oil selected from the group consisting of epoxidized linseed oils, epoxidized soybean oils, epoxidized corn oils, epoxidized cotton seed oils, epoxidized perilla oils and epoxidized safflower oils having an epoxide equivalent weight of about 225 to about 475 and a monocarboxylic acid or monohydric phenol in the presence of a catalyst under conditions effective to provide an epoxidized vegetable oil adduct having an epoxide equivalent weight of about 400 to about 475;
    (b) reacting the epoxidized vegetable oil adduct, a diglycidyl ether of a dihydric phenol having an epoxide equivalent weight of about 115 to about 250, and a dihydric phenol to produce a higher molecular weight resin; and
    (c) reacting the higher molecular weight resin, an unsaturated fatty acid and an alkylacetoacetate to produce the epoxy ester.

* * * * *